(No Model.)
T. A. EDISON.
REGULATOR FOR DYNAMO ELECTRIC MACHINES.
No. 287,524. Patented Oct. 30, 1883.
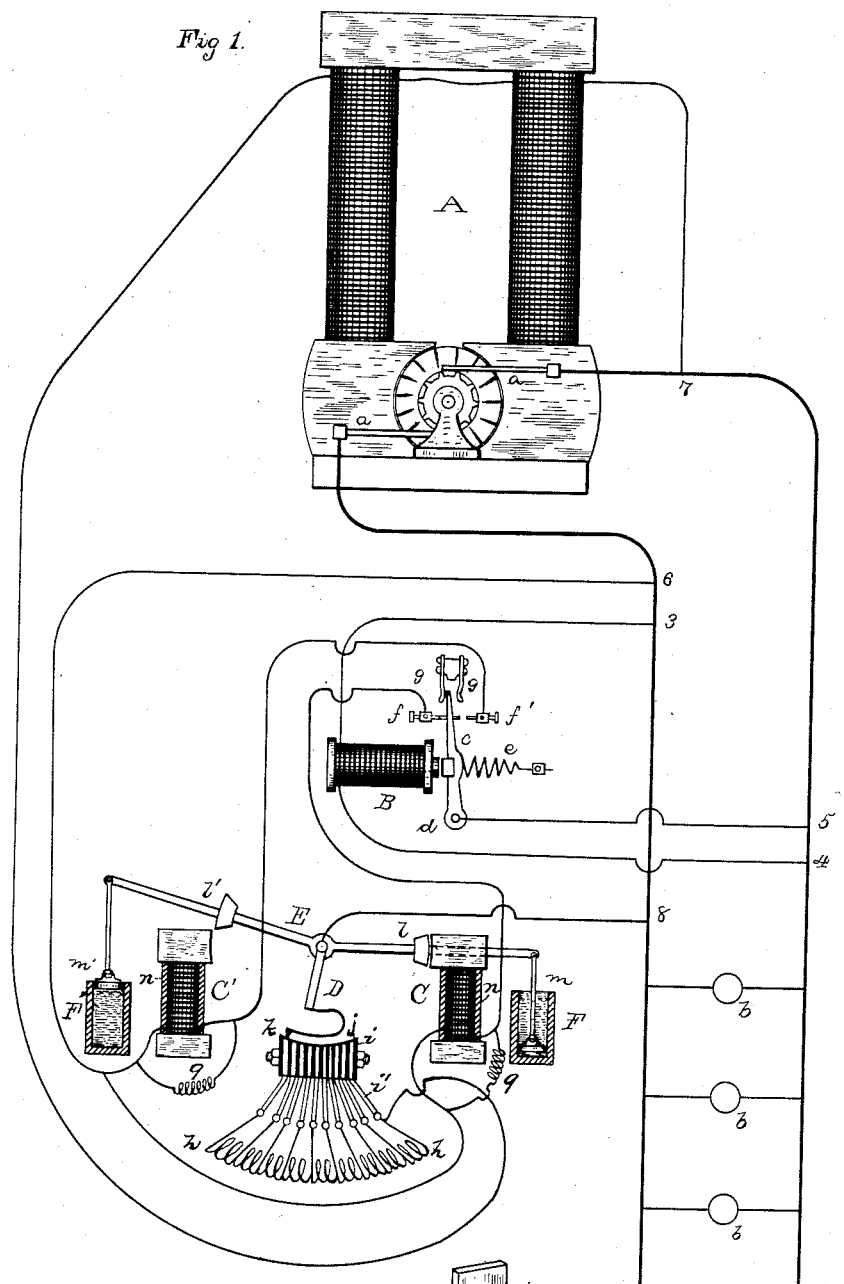
ATTEST: 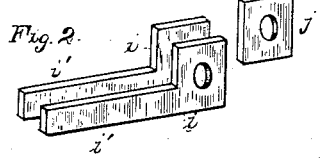
INVENTOR
Thomas A. Edison,
By Rich'd N. Dyer,
Atty.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

REGULATOR FOR DYNAMO-ELECTRIC MACHINES.

SPECIFICATION forming part of Letters Patent No. 287,524, dated October 30, 1883.

Application filed December 8, 1882. (No model.)

*To all whom it may concern:*

Be it known that I, THOMAS A. EDISON, of Menlo Park, in the county of Middlesex and State of New Jersey, have invented a new and useful Improvement in Regulators for Dynamo-Electric Machines, (Case No. 526,) of which the following is a specification.

The object I have in view is to produce a simple and efficient apparatus for regulating the generation of current by dynamo or magneto electric machines which supply current to multiple-arc systems of electrical distribution, such regulation being accomplished by an adjustable resistance which affects the circuits energizing the field-of-force magnets of such machines.

In carrying out my invention the field-magnet coils of the generator preferably form part of a multiple-arc circuit derived from the main conductors of the machine, though the field-magnet may be energized from an external source, if desired. In another multiple-arc circuit from the main conductors is placed an electro-magnet provided with a pivoted spring-retracted armature, which armature forms part of a third multiple-arc circuit. The free end of the armature is normally held centrally between two contact-points, and as it is drawn in one or the other direction, by the magnet or by the spring, it completes circuit through one or the other of two operating electro-magnets, each placed in a division of the third multiple-arc circuit. The "pressure" or regulating electro-magnet, which is located in a derived or multiple-arc circuit, so as to be affected exactly as is a lamp or other transmitting device, if wound with copper wire, as heretofore, is unduly affected by changes in temperature, which modify its resistance to such an extent that the adjustment is destroyed. To overcome this difficulty I wind this regulating electro-magnet with German-silver wire, or wire of other metals or alloys not unduly affected by changes in temperature. Instead of having the operating electro-magnets in a multiple-arc circuit, they may be in a shunt-circuit from one of the main conductors, or other circuit having sufficient energy to work them. In the field-circuit of the generator are placed a resistance and an arm for adjusting said resistance. The adjusting-arm is attached to a centrally-pivoted bar, near each end of which is placed an armature which is attracted by one of the pair of operating electro-magnets and worked across the face of such magnet, and to each end of the bar is also attached a plunger entering a dash-pot filled with liquid. As one or the other magnet is energized one end or the other of the pivoted arm is drawn down, the movement being retarded and regulated by the plungers, and the adjusting-arm is thus moved in one or the other direction, so as to throw in or cut out resistance from the field-circuit, according to the requirements of the system. The operating electro-magnets are provided with means for preventing or diminishing the spark at the contact-points of the armature-lever of the regulating-magnet due to the breaking of a magnet-circuit, such means consisting, preferably, of a shunt around each operating-magnet, which provides a path other than that across the break at the contact-points for the current due to the discharge of the magnet, and also of a copper tube or cylinder surrounding each operating magnet-coil to provide a local or short circuit for the extra or induced currents. The dash-pot plungers are so formed and adjusted that their action will be in unison with the charging and discharging times of the field-magnet, so as to prevent oscillation of the pivoted bar and contact-arm, for if the plunger were so adjusted as to fall too quickly the resistance would be placed in or taken out of circuit too rapidly, so that the current would increase or decrease so as to cause an opposite movement of the plunger, and the plunger would vibrate until the proper point of regulation was reached, when it would stop; but the plungers being regulated so as to move in accordance with the conditions of the field-magnet the contact-arm will move to the proper point at once and will remain there without vibrating.

The commutator for the adjustable resistance is of a novel and efficient form, the object in view being to so construct a resistance that a very slight movement of the adjusting-arm will be sufficient to cause a considerable variation in the resistance. Such commutator consists of a number of thin metal plates, forming the contacting parts of the resistance, fastened together by an insulated pin or bolt, and having plates of mica or other similar insulation between them. The metal plates have outwardly-extending tongues, which are spread out in fan shape, and wires are connected with them, which include the resistance-coils, a considerable number of such coils being included between each pair of plates. The resistance is varied by means of a contact-point attached to a flexible contact-arm, such arm being attached to the pivoted center of the bar which carries the armatures and plungers, so that as such arm moves the contact-arm is carried in one direction or the other, and the contact-point slides over the edges of the contact-plates of the resistance, throwing the resistance-coils in or out of circuit as it moves from one plate to the next.

My invention is illustrated in the accompanying drawings, in which—

Figure 1 represents an apparatus embodying the same, mostly in diagram; and Fig. 2 is a representation of the plates of the adjustable resistance.

A is the field-magnet, and $a$ $a$ are the commutator-brushes of a dynamo or magneto electric machine.

1 2 are main conductors leading from the machine, and having lamps or other translating devices, $b$ $b$, arranged in multiple arc upon them.

In a multiple-arc circuit, 3 4, is placed an electro-magnet, B, wound with German silver, for the purpose before set forth, and having an armature, $c$, pivoted at $d$, and retracted by an adjustable spring, $e$. The armature-lever $c$ forms part of the operating-circuit 5 6. Its free end is provided with contact-points, and such end plays between other contact-points, $f f'$. The armature is normally held midway between $f$ and $f'$ by spring-fingers $g$ $g$. The circuit 5 6 is divided, one division including an electro-magnet, C, the other an electro-magnet, C', which electro-magnets are the operating-magnets.

The field-magnet A is energized by the current in the multiple-arc circuit 7 8. In this circuit are connected the resistance-coils $h$ $h$ and the flexible contact-arm D. The wires from the coils $h$ $h$ are connected with the fingers $i'$ of the metal commutator-plates $i$, such plates $i$ having plates $j$, of mica or other suitable insulation, between them. The mica insulation only separates the bodies of the plates $i$, the fingers $i'$ being spread out into a fan shape, as shown in Fig. 1, to permit of the attachment of the wires thereto. The contact-point $k$, attached to the spring-arm D, rests on the edges of the plates. The contact-arm D is attached to the middle of the pivoted bar E. To the bar E are attached armatures $l$ $l'$, one for each of the magnets C C', which armatures work across the faces of the polar extensions of the magnets, so as to have an increased movement. Plungers $m$ $m'$ are attached one to each end of the bar E, entering, respectively, dash-pots F F', containing liquid.

As the number of lamps in the main circuit is increased the decrease of current in the circuit 3 4 causes the spring $e$ to draw armature $c$ away from magnet B, completing circuit at $f'$ through magnet C', attracting armature $l'$, and throwing up armature $l$, and so moving spring-arm D and contact $k$ as to remove a portion of the resistance $h$ $h$ from the field-circuit 7 8, the movement being regulated by the plungers $m$ $m'$, which, as stated, are adjusted to act in unison with the charging and discharging times of the field-magnet, such adjustment being obtained by varying the size of the plungers, or of the apertures in them, until the proper adjustment is obtained, or in any other suitable way.

It is evident that only one plunger might be employed, attached to either end of the pivoted bar E and properly adjusted.

The removal of lamps from circuit by causing the magnet B to attract armature $c$ against contact-point $f$ causes magnet C to attract armature $l$ and place resistance in the field-circuit. Around each magnet C C' is placed a shunt-circuit, 9, to form a path for the discharge of the magnet when the circuit is broken at $f f'$, and prevent the destruction of these contact-points by the spark. Around each magnet-coil is a non-magnetic cylinder, $n$, (shown in section,) for the purpose before explained.

I do not claim herein any of the devices covered by my patents numbered 265,783 and 264,660.

The resistance-commutator, *per se*, is not claimed herein, but will be included in a separate application for patent; and it is to be understood that all features of patentable novelty described or shown, but not claimed herein, are reserved for protection by other patents, and have been or will be included in other applications for patents.

What I claim is—

1. In regulators for electrical generators, the combination, with the regulating electro-magnet, of the oppositely-acting operating electro-magnets and armatures moving across the faces of the polar extensions of such operating-magnets, substantially as set forth.

2. The combination, with a dynamo or magneto electric machine and translating devices arranged in multiple arc, of an adjustable resistance for regulating the generation of current, an arm for varying such resistance, a pivoted bar carrying said arm and having armatures at the ends thereof, two electro-magnets acting oppositely on said bar, the armatures of which move across the faces of the polar extensions of said operating electro-magnets, and a controlling electro-magnet located in a multiple-arc circuit, substantially as set forth.

3. In regulators for electrical generators of the character herein described, the combination, with the operating electro-magnets, of the regulating electro-magnet wound with German silver, or other alloy or metal not unduly affected by changes in temperature, substantially as set forth.

4. The combination, with the adjustable resistance and the arm for varying the same, of the two operating electro-magnets acting oppositely upon armatures moving across the faces of the polar extensions of said electro-magnets and working the arm in opposite directions, and one or more dash-pots and plungers for retarding the movement of said arm, substantially as set forth.

5. The combination, with the adjustable resistance in the field-circuit of the generator and the arm for varying the same, of the regulating and operating electro-magnets and the dash-pots and plungers, said plungers being adjusted, as explained, to act in unison with the charging and discharging times of the field-magnet, substantially as set forth.

6. The combination, with the controlling-magnet B, its armature-lever, and the contact-points of said lever, of the magnets in the divided circuits from said contact-points, and means for preventing the spark at such points, due to the discharge of the magnets, substantially as set forth.

7. The combination, with the controlling electro-magnetic switch and the operating electro-magnets, of shunts around said operating-magnets, and metallic shells upon the same, for preventing spark at the contact-points of said switch, substantially as set forth.

8. The combination, with the resistance-commutator, such as described, of the flexible contact-arm carrying a contact-point, the pivoted bar carrying said spring-arm, the operating electro-magnets acting oppositely upon said bar, and one or more dash-pots and plungers for retarding the movement of said bar, substantially as set forth.

This specification signed and witnessed this 28th day of November, 1882.

THOS. A. EDISON.

Witnesses:
H. W. SEELY,
E. H. PYATT.